United States Patent
Hakobyan et al.

(10) Patent No.: US 12,535,558 B2
(45) Date of Patent: Jan. 27, 2026

(54) METHOD AND DEVICE FOR DETERMINING A CLASSIFICATION FOR AN OBJECT BASED ON A RADAR SPECTRUM AND RADAR REFLECTIONS

(71) Applicant: Robert Bosch GmbH, Stuttgart (DE)

(72) Inventors: Gor Hakobyan, Schoenaich (DE); Axel Javier Acosta Aponte, Cologne (DE); Loveneet Saini, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 254 days.

(21) Appl. No.: 18/522,469

(22) Filed: Nov. 29, 2023

(65) Prior Publication Data

US 2024/0183943 A1    Jun. 6, 2024

(30) Foreign Application Priority Data

Dec. 5, 2022    (DE) ...................... 10 2022 213 062.6

(51) Int. Cl.
  *G01S 7/41*    (2006.01)
  *G01S 13/42*   (2006.01)

(52) U.S. Cl.
  CPC ............... *G01S 7/411* (2013.01); *G01S 13/42* (2013.01)

(58) Field of Classification Search
  CPC ........ G01S 7/411; G01S 13/42; G01S 13/726; G01S 13/58; G01S 7/417; G01S 7/41; G01S 13/88
  See application file for complete search history.

(56) References Cited

U.S. PATENT DOCUMENTS

| | | | | |
|---|---|---|---|---|
| 11,055,605 | B2 * | 7/2021 | Graf | G06N 3/08 |
| 2023/0359866 | A1 * | 11/2023 | Shin | G06N 3/08 |
| 2024/0289355 | A1 * | 8/2024 | Lin | G06N 3/044 |

FOREIGN PATENT DOCUMENTS

WO   WO-2024081177 A1 *   4/2024   ............... G06N 3/08

OTHER PUBLICATIONS

Huang, et al: "Dual-Graph Attention Convolution Network for 3-D Point Cloud Classification," IEEE Transactions on Neural Networks and Learning Systems, 35(4), (2024) pp. 4813-4825.—ISSN 2162-2388.

* cited by examiner

*Primary Examiner* — William Kelleher
*Assistant Examiner* — Juliana Cross
(74) *Attorney, Agent, or Firm* — NORTON ROSE FULBRIGHT US LLP

(57) ABSTRACT

A device and method for determining a classification of an object. A radar spectrum which includes radar reflections is determined as a function of sensor data from a radar sensor. Embeddings of sections from the radar spectrum which include at least one radar reflection are determined and each is assigned to a node of a first graph. Edges are determined as a function of pairwise distances between the embeddings which are assigned to the nodes. For each edge, a feature for the edge is determined as a function of the embeddings of two nodes which are connected to one another by the edge. For each node, a feature for the node is determined as a function of the features for the edges which connect the node to another node. A characteristic quantity is provided for each radar reflection as a function of the sensor data.

11 Claims, 3 Drawing Sheets

METHOD AND DEVICE FOR DETERMINING A CLASSIFICATION FOR AN OBJECT BASED ON A RADAR SPECTRUM AND RADAR REFLECTIONS

CROSS REFERENCE

The present application claims the benefit under 35 U.S.C. § 119 of German Patent Application No. DE 10 2022 213 062.6 filed on Dec. 5, 2022, which is expressly incorporated herein by reference in its entirety.

FIELD

The present invention relates to a method and a device for determining a classification for an object based on a radar spectrum and radar reflections.

SUMMARY

Through the method and the device according to the present invention, a classification of an object based on a representation of a radar spectrum and radar reflections as a graph in each case is improved.

According to an example embodiment of the present invention, the method for determining the classification of the object provides that sensor data are acquired with a radar sensor, a radar spectrum which comprises radar reflections being determined as a function of the sensor data, embeddings of sections from the radar spectrum which comprise at least one radar reflection being determined which are each assigned to a node of a first graph, edges of the first graph being determined as a function of pairwise distances between the embeddings which are assigned to the nodes of the first graph, for each edge of the first graph a feature for this edge of the first graph being determined as a function of the embeddings of two nodes of the first graph which are connected to one another by this edge of the first graph, for each node of the first graph a feature for this node of the first graph being determined as a function of the features for the edges of the first graph which connect this node of the first graph in the first graph to another node of the first graph, characteristic quantities, in particular spatial coordinates or at least one measured property, being provided for each radar reflection as a function of the sensor data, for each radar reflection an embedding being determined which is assigned to a node of a second graph and which comprises an embedding of the characteristic quantities and the characteristic quantities, edges of the second graph being determined as a function of pairwise distances between the embeddings which are assigned to the nodes of the second graph, for each edge of the second graph a feature for this edge of the second graph being determined as a function of the embeddings of two nodes of the second graph which are connected to one another by this edge of the second graph, for each node of the second graph a feature for this node of the second graph being determined as a function of the features for the edges of the second graph which connect this node of the second graph in the second graph to another node of the second graph, the classification of the object being determined as a function of a quantity which comprises a first part, which is determined as a function of the features for the nodes of the first graph, and which comprises a second part, which is determined as a function of the features for the nodes of the second graph. The connectivity of each graph is determined by distances. The first graph is determined without first determining Region of Interests, ROI, for the object. This significantly reduces the computational effort compared to conventional methods in which ROI are used. The combination of the features extracted from the two graphs improves the classification.

Preferably, according to an example embodiment of the present invention, the embeddings of sections from the radar spectrum comprise embedded features, the embedded features being extracted from spectral features from the sections using an encoder.

The first graph and/or the second graph is preferably formed in a feature space extended by the features.

Preferably, according to an example embodiment of the present invention, the quantity comprises a third part which comprises the embeddings of the nodes of the first graph and/or which comprises the embeddings of the nodes of the second graph. The combination of this part of the quantity preserves knowledge from the initial graph or graphs and further improves the classification.

According to an example embodiment of the present invention, the pairwise distance of embeddings which are each assigned to one of the nodes of the first graph is preferably determined as a function of a difference between these embeddings. The difference is, for example, the L2 norm of vectors that represent the embeddings. The resulting edges represent the relative proximity to each other of sections containing reflections.

According to an example embodiment of the present invention, the pairwise distance of embeddings which are each assigned to one of the nodes of the second graph is preferably determined as a function of a difference between these embeddings. The resulting edges represent a relative proximity of reflections to one another.

According to an example embodiment of the present invention, for each node of the first graph, the characteristic for this node of the first graph is preferably determined as a function of a distance from the radar sensor and a Doppler velocity which is assigned to a radar reflection which comprises the section of the radar spectrum assigned to this node. This integrates additional information into the first graph, which improves the classification.

Preferably, according to an example embodiment of the present invention, the first graph comprises edges which each connect one of the nodes to a specified number of its closest nodes in the first graph, or the first graph comprising edges which each connect one of the nodes of the first graph to a specified number of its most distant nodes of the first graph, the first graph comprising edges which each connect one of the nodes of the first graph to a specified number of randomly selected other nodes of the first graph, or the first graph comprising edges by which each node in the first graph is connected to every other node of the first graph by an edge. These rules enable a very efficient determination of the connectivity of the first graph.

Preferably, according to an example embodiment of the present invention, the second graph comprises edges which each connect one of the nodes to a specified number of its nearest nodes in the second graph, or the second graph comprising edges which each connect one of the nodes of the second graph to a specified number of its most distant nodes of the second graph, the second graph comprising edges which each connect one of the nodes of the second graph to a specified number of randomly selected other nodes of the second graph, or the second graph comprising edges by which each node in the second graph is connected to every other node of the second graph by an edge. These rules enable a very efficient determination of the connectivity of the second graph.

According to an example embodiment of the present invention, the device for determining the classification of the object comprises at least one memory and at least one processor, the at least one processor being designed to execute machine-readable instructions upon the execution of which the method is executed, and the at least one memory being designed to store the instructions. This device has advantages that correspond to those of the method according to the present invention.

In one example embodiment of the present invention, the device comprises a radar sensor for acquiring sensor data.

In one example embodiment of the present invention, the device comprises an output, which is designed to output the classification.

According to an example embodiment of the present invention, a program that comprises machine-readable instructions, upon the execution of which by a device for determining a classification of an object the method runs, has advantages that correspond to those of the method according to the present invention.

Further advantageous embodiments can be found in the following description and the figures.

DETAILED DESCRIPTION OF EXAMPLE EMBODIMENTS

Figure 1:
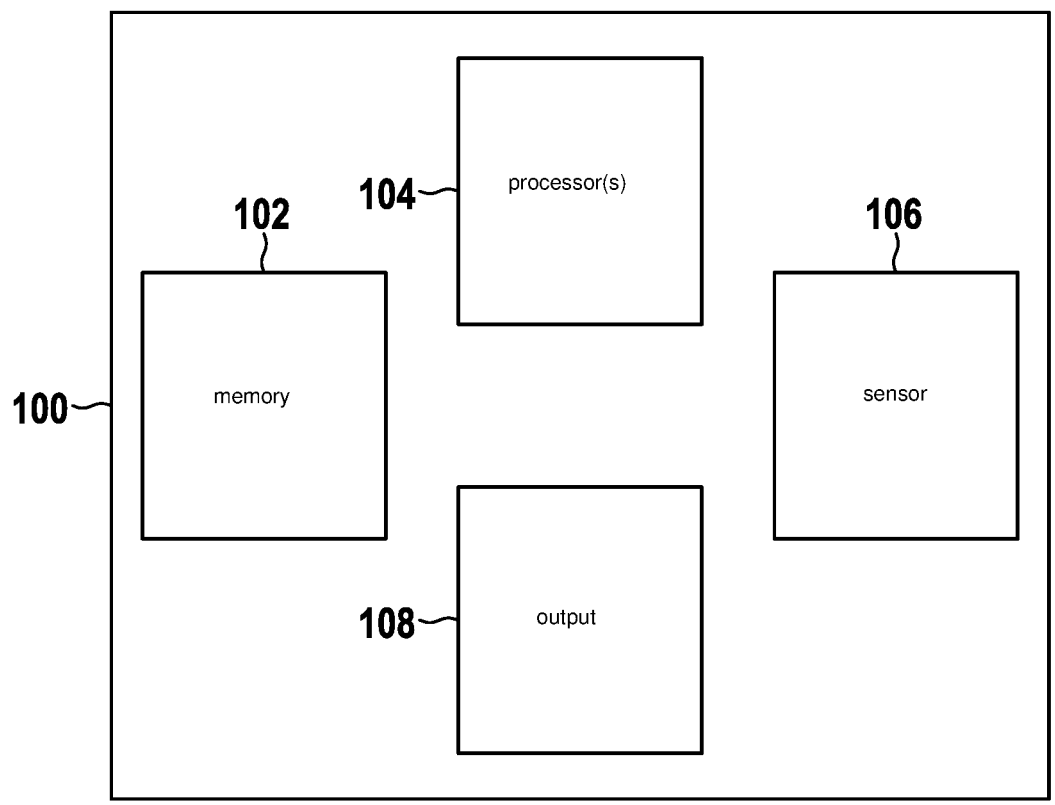
FIG. 1 shows a schematic representation of a device for determining a classification of an object, according to an example embodiment of the present invention.

FIG. 1 schematically shows a device 100 for determining a classification of an object.

The device 100 comprises at least one memory 102 and at least one processor 104. In one embodiment, the device 100 comprises a sensor 106. The sensor 106 is for example a radar sensor.

The at least one processor 104 is designed to execute machine-readable instructions upon the execution of which a method for determining the classification is executed. The at least one memory 102 is designed to store the instructions. The instructions are for example part of a program. The program comprises the instructions.

In one embodiment, the device 100 comprises an output 108, which is designed to output the classification in particular for a downstream function.

Figure 2:
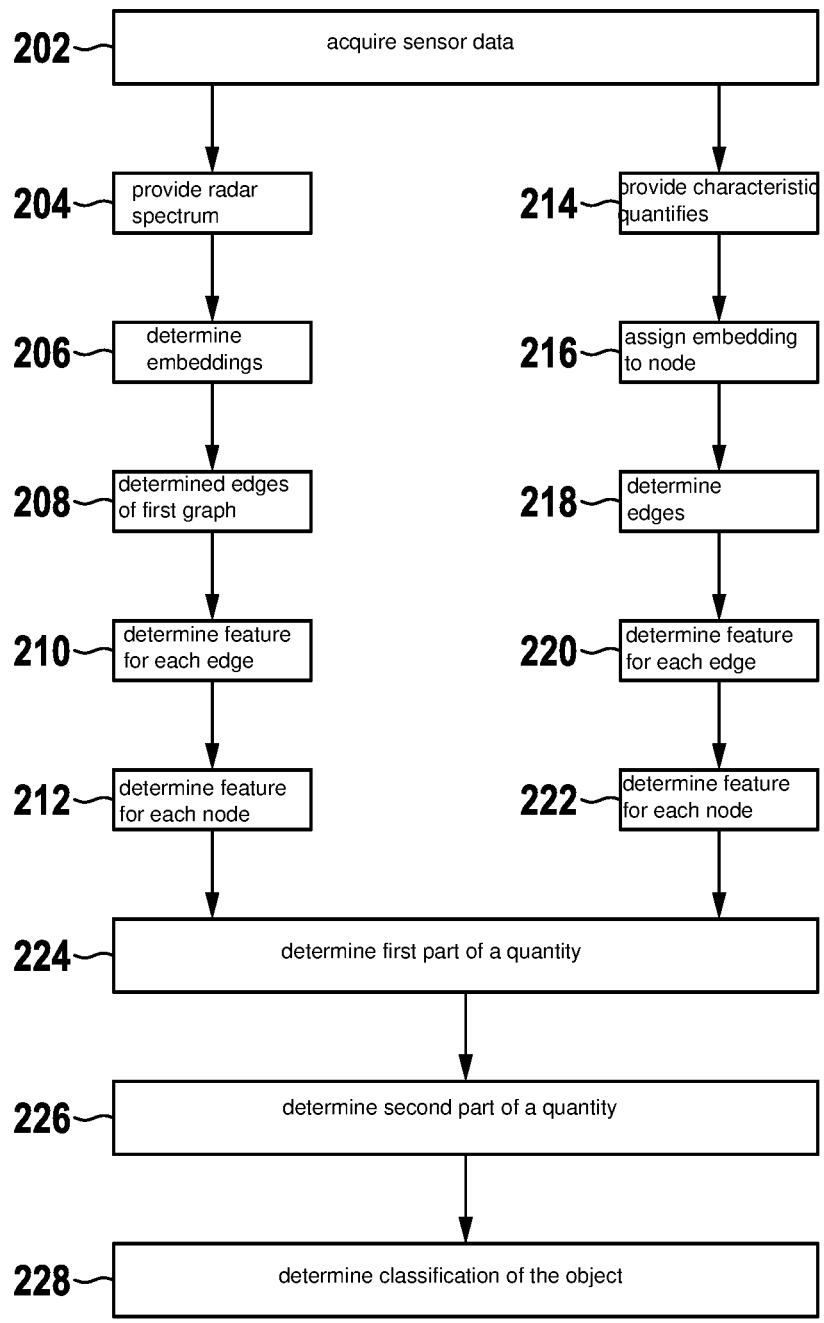
FIG. 2 shows steps in a method for determining the classification, according to an example embodiment of the present invention.

In FIG. 2, steps in the method are shown. It can be provided that the method is implemented on the sensor 106 itself, for example on a digital signal processor or microcontroller in the sensor 106. The method is described for a radar spectrum and radar reflections of objects. The method is described for sensor data that are acquired with the sensor 106.

The method comprises a step 202.

In step 202, the sensor data are acquired.

The method can provide that sensor data that have already been acquired are used, in which case step 202 is omitted.

In a step 204, the radar spectrum is provided. The radar spectrum 204 is determined for example as a function of the sensor data.

The method can provide that an already-provided radar spectrum is used, in which case step 204 is omitted.

The radar spectrum comprises radar reflections. In the example, the radar spectrum comprises at least one radar reflection of the object. The radar spectrum can also comprise radar reflections of other objects.

In a step 206, embeddings of sections of the radar spectrum comprising at least one radar reflection are determined.

The embeddings are each assigned to a node of a first graph.

In a step 208, edges of the first graph are determined.

The edges of the first graph are determined as a function of the pairwise distances of the embeddings assigned to the nodes of the first graph.

The pairwise distance in each case is determined, for example, as a function of a difference between these embeddings.

In the example, the first graph comprises edges that each connect one of the nodes with a specified number of its nearest nodes in the first graph. For example, a number K of nearest neighbors of the node is determined.

It can also be provided that the first graph comprises edges which each connect one of the nodes of the first graph to a specified number of its most distant nodes of the first graph.

It can also be provided that the first graph comprises edges, each of which connects one of the nodes of the first graph to a specified number of randomly selected other nodes of the first graph.

It can also be provided that the first graph comprises edges by which each node in the first graph is connected to each other node of the first graph by an edge.

In a step 210, for each edge of the first graph a feature is determined for this edge of the first graph.

The feature in each case is determined as a function of the embeddings of two nodes of the first graph, which are connected to one another by this edge of the first graph.

In a step 212, for each node of the first graph a feature for this node of the first graph is determined.

The feature in each case is determined as a function of the features for the edges of the first graph that connect this node of the first graph in the first graph with another node of the first graph.

Optionally, for each node of the first graph the feature for this node is determined as a function of a distance from the sensor 106 and a Doppler velocity. The distance and Doppler velocity are assigned, for example, to the radar reflection from the section assigned to this node.

In a step 214, characteristic quantities are provided for each radar reflection.

The characteristic quantities are determined for example as a function of the sensor data.

The characteristic quantities include for example spatial coordinates or at least one measured property of the radar reflection.

The method can provide that already-provided characteristic quantities are used, in which case step 214 is omitted.

If neither step 204 nor step 214 is carried out, it can be provided that step 202 is omitted.

In a step 216, an embedding assigned to a node of a second graph is determined for each radar reflection. This embedding comprises an embedding of the characteristic quantities and the characteristic quantities themselves that were determined based on this radar reflection. On the one hand, this provides additional features. On the other hand, the characteristic quantities themselves remain directly available.

In a step 218, edges of the second graph are determined as a function of pairwise distances of the embeddings which are assigned to the nodes of the second graph.

The pairwise distance in each case is determined, for example, as a function of a difference between these embeddings.

In the example, the second graph comprises edges that each connect one of the nodes with a specified number of its nearest nodes in the second graph. For example, a number K of nearest neighbors of the node is determined.

It can also be provided that the second graph comprises edges, which each connect one of the nodes of the second graph to a specified number of its most distant nodes of the second graph.

It can also be provided that the second graph comprises edges, which each connect one of the nodes of the second graph with a specified number of randomly selected other nodes of the first graph.

It can also be provided that the second graph comprises edges, by which each node in the second graph is connected to each other node of the second graph by an edge.

In a step 220, for each edge of the second graph a feature is determined for this edge of the second graph.

This feature is determined as a function of the embeddings of two nodes of the second graph, which are connected to one another by this edge.

In a step 222, for each node of the second graph a feature for this node of the second graph is determined.

The feature for this node is determined as a function of the features for the edges of the second graph that connect this node to another node.

In a step 224, a first part of a quantity is determined. The first part is determined as a function of the characteristics for the nodes of the first graph.

It can be provided to determine further features for the edges of the first graph and further features for the nodes of the first graph in a plurality of layers for the first graph as a function of the features for the nodes of the first graph per layer. It can be provided to determine the first part of the quantity as a function of the further features for the nodes of the first graph from a last one of the plurality of layers for the first graph.

In a step 226, a second part of the quantity is determined. The second part is determined as a function of the features for the nodes of the second graph.

It can be provided to determine further features for the edges of the second graph and further features for the nodes of the second graph in a plurality of layers for the second graph as a function of the features for the nodes of the second graph per layer. It can be provided to determine the second part of the quantity as a function of the further features for the nodes of the second graph from a last one of the plurality of layers for the second graph.

In a step 228, the classification of the object is determined as a function of the quantity.

In one embodiment, an output of the classification is provided in particular for a downstream function.

It can be provided that the quantity comprises a third part. In one embodiment, the third part comprises the embeddings of the nodes of the first graph. In one embodiment, the third part comprises the embeddings of the nodes of the second graph. In one embodiment, the third part comprises the embeddings of the nodes of the first graph and the embeddings of the nodes of the second graph. The embeddings of the initial graph(s) are directly available through the third part.

Steps 204 to 212 may be carried out substantially in parallel with steps 214 to 222, or one after the other.

Figure 3:
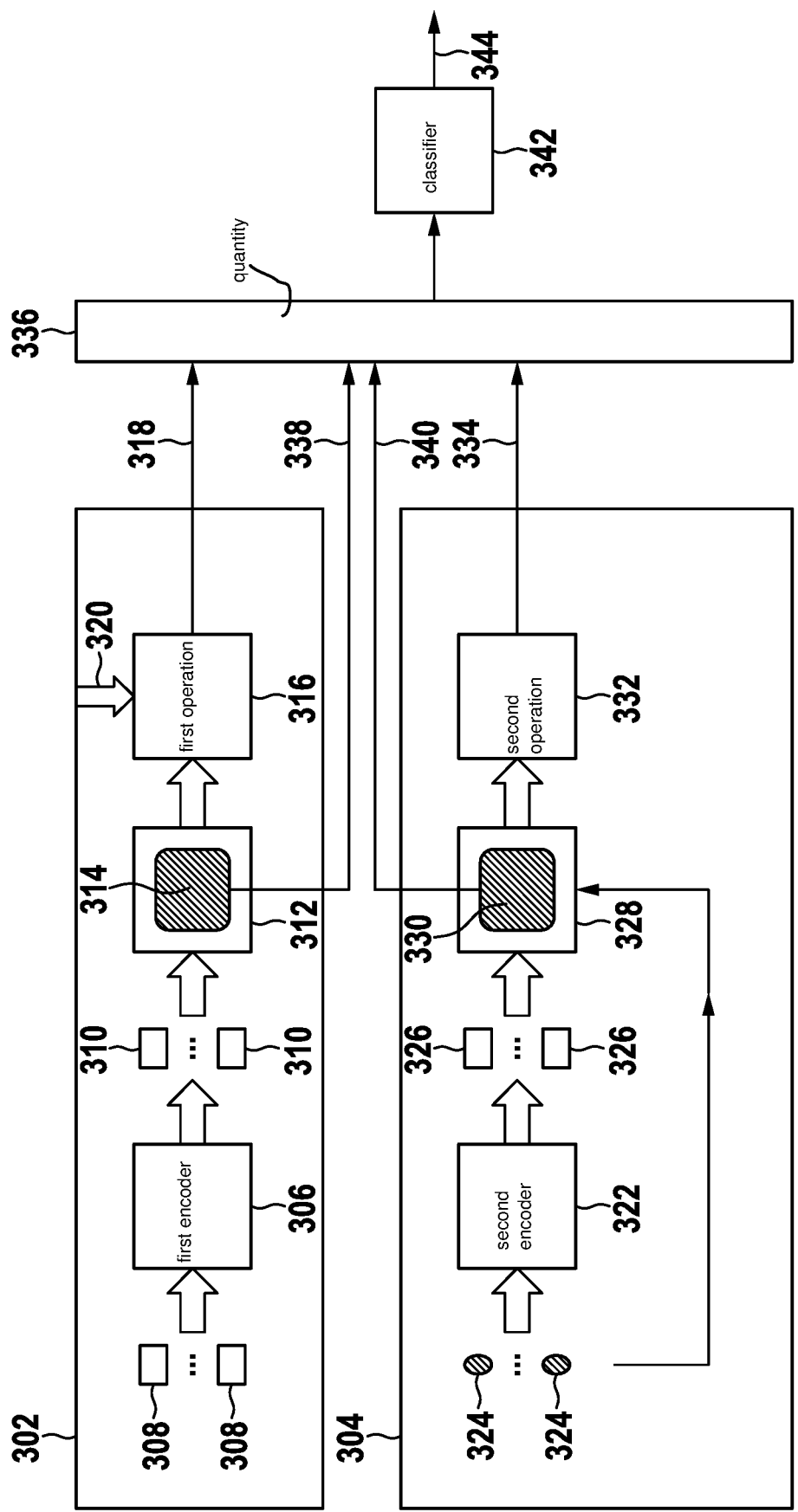
FIG. 3 shows a schematic representation of a procedure for determining the classification, according to an example embodiment of the present invention.

FIG. 3 shows a schematic representation of a procedure for determining the classification.

The procedure comprises a first branch 302 for processing the sections from the spectrum and a second branch 304 for processing the characteristic quantities.

The first branch 302 comprises a first encoder 306, which is designed to determine, for sections 308 from the spectrum, their embeddings 310 assigned to the nodes of the first graph. The first encoder 306 is designed to determine, for each section 308 from the spectrum, the embedding 310 that is assigned to this section 308. For example, an embedding vector with 16 dimensions is generated from a 5×5 spectral section 308.

It can be provided that the embeddings 310 of sections 308 from the radar spectrum comprise embedded features. The embedded features are extracted with the first encoder 306 from spectral features from the sections 308.

In one example, the first graph and/or the second graph are formed in a feature space extended by the features.

The first branch 302 comprises a first function 312, which is designed to determine a numeric representation 314 of the first graph as a function of the embeddings which are assigned to the nodes of the first graph. In the example, the numerical representation 314 comprises a first matrix $A_{i,j}$, which assigns an edge to a node i and a node j by means of an entry, e.g., 1, in an element with index i,j in the matrix $A_{i,j}$, or by an entry, e.g., 0, in an element with index i,j in the matrix $A_{i,j}$, does not assign an edge. In the example, the numerical representation 314 of the first graph comprises a second matrix, $P_i$, which assigns a feature vector $F_i$ to each node. In the example, N rows of 1×M dimensional feature vectors $F_i$ are arranged. In the example, the content of the feature vector $F_i$ of a node i is the embedding of this node i. The entries in the first matrix $A_{i,j}$ are for example determined using the method of K nearest neighbors, as a function of the embeddings 310. This means that the K nearest nodes to a node are determined as a function of the distance of the embedding 310 assigned to it in each case.

The first branch 302 comprises at least one first operation 316, which is designed to determine the features of the edges and the features of the nodes of the first graph as a function of the embeddings 310 that are assigned to the nodes of the first graph and as a function of the edges of the first graph, i.e., as a function of the numerical representation 314 of the first graph. In the example, a feature $e_{ij}$ of an edge which connects a node i and a node j is determined as a function of the respective feature vectors $F_i$ and $F_j$ of these nodes. An example is a mapping with a convolution function $h_\Theta(\bullet)$ for the edges of the first graph $$e_{ij}=h_\Theta(F_i,F_j-F_i)$$

with the parameters $\Theta$. The convolution function is, for example, a graph convolution, in particular EdgeConv.

In the example, a feature of a node i is determined starting from a set E of nodes j to be taken into account, as follows:

$$F'_i = \max_{j:(i,j)\in E} e_{i,j}$$

The set E is defined for example as the set of nodes j directly connected to the node i by an edge.

An output quantity 318 of the first operation 316 comprises the features $F'_i$.

It can be provided that the first operation 116 comprises a plurality of layers and the output quantity 318 comprises the features $F'_i$ of a last one of the plurality of layers. For example, the features $F'_i$ in each of the layers are determined as a function of the features $F'_i$ which are determined in a layer immediately preceding this one.

It can be provided that the first operation 116 takes into account additional input quantities 320. Example it can be provided that the feature $F'_i$ of a node i is determined as a function of a distance r from the sensor and a Doppler velocity v which are assigned to the node i. In the example, the section of the spectrum assigned to the node i comprises a reflection of which the distance and Doppler velocity are used to determine the feature $F'_i$ of this node. For example, a feature vector $F_i = [r, v, s_i]$ is used.

The second branch 304 comprises a second encoder 322, which is designed to determine, for characteristic quantities 324, which are each assigned to a reflection, embeddings 326 assigned to the nodes of the second graph. A characteristic quantity 324 of a reflection comprises, for example, the spatial coordinates or at least one measured property of the reflection. In the example, a feature vector $G_i = \{p_i, s_i\}$ is provided which comprises spatial coordinates $p_i \in \mathbb{R}^3$ and a measured property or a plurality of measured properties $s_i \in \mathbb{R}^{N_f}$ for a reflection i, where $N_f$ indicates the number of properties. The second encoder 322 is designed to determine, for the characteristic quantities 324 for reflections from a list of N reflections $O = \{v_1, v_2, \ldots, v_N\}$, the embedding 326 assigned to the relevant characteristic quantity 324.

The second branch 304 comprises a second function 328 which is designed to determine a numeric representation 330 of the second graph as a function of the embeddings which are assigned to the nodes of the first graph, and to determine the characteristic quantities 324. In the example, the numerical representation 330 comprises a second matrix $B_{i,j}$, which assigns an edge to a node i and a node j by means of an entry, e.g., 1, in an element with index i,j in the matrix $B_{i,j}$, or by an entry, e.g., 0, in an element with index i,j in the matrix $B_{i,j}$, does not assign an edge. In the example, the numerical representation 330 of the second graph comprises a second matrix, $S_i$, which assigns a feature vector $G_i$ to each node. In the example, O rows of 1×Q dimensional feature vectors $G_i$ are arranged. In the example, the content of the feature vector $G_i$ of a node i is the embedding of this node i. The entries in the first matrix $B_{i,j}$ are for example determined using the method of K nearest neighbors, as a function of the embeddings 326 and the characteristic quantities 324. This means that the K nearest nodes to a node are determined as a function of the distance of the embedding 326 and characteristic quantities 324 assigned to it in each case. These are, e.g., concatenated, i.e., combined into a vector, before the distance is determined.

The second branch 304 comprises at least one second operation 332, which is designed to determine the features of the edges and the features of the nodes of the first graph as a function of the embeddings 326 assigned to the nodes of the second graph and as a function of the edges of the second graph, i.e., as a function of the numerical representation 330 of the first graph. In the example, a feature $e_{ij}$ of an edge which connects a node i and a node j is determined as a function of the respective feature vectors $G_i$ and $G_i$ of these nodes. An example is a mapping with a convolution function $h_\Theta(\cdot)$ for the edges of the second graph $$e_{ij} h_\Theta(G_i, G_j - G_i)$$

with the parameters $\Theta$. The convolution function is, for example, a graph convolution, in particular EdgeConv.

In the example, a feature of a node i is determined starting from a set E of nodes j to be taken into account, as follows:

$$G'_i = \max_{j:(i,j) \in E} e_{ij}$$

The set E is defined for example as the set of nodes j directly connected to the node i by an edge.

An output quantity 334 of the second operation 332 comprises the features $G'_i$.

It can be provided that the second operation 332 comprises a plurality of layers and the output quantity 334 comprises the features $G'_i$ of a last of the plurality of layers. For example, the features $G'_i$ in each of the layers are determined as a function of the features $G'_i$ which are determined in a layer immediately preceding this one.

In the example, the output quantity 318 of the first operation 320 and the output quantity 334 of the second operation 332 are concatenated to form a quantity 336.

It can be provided that embeddings 338 of the nodes of the first graph and/or embeddings 340 of the nodes of the second graph are also concatenated to form the quantity 336.

A classifier 342 is designed to determine a classification 344 of the object as a function of the quantity 336. This means that the classifier 342 determines the classification 344 of the object as a function of the quantity 336, which comprises the output quantities from both branches.

In one embodiment, the first encoder 306 comprises a neural network. This neural network comprises, for example, a first convolutional layer, which is connected to a second convolutional layer via a ReLU activation. The individual embeddings 310 are determined, for example, by means of ReLU activation and are then combined to form a common input quantity for the first function 312.

In one embodiment, the second encoder 322 comprises a neural network. This neural network comprises, for example, a first linear layer, which is connected to a second linear layer via a ReLU activation. The individual embeddings 326 are determined, for example, by means of ReLU activation and are then combined to form a common input quantity for the second function 328. This common input quantity can also comprise the characteristic quantities 324.

In one embodiment, the first operation 316 comprises a neural network. This neural network comprises, for example, a first convolutional layer, which is connected to a second convolutional layer via a ReLU activation. In the example, the output of the ReLU activation together with the embeddings 338 of the nodes of the first graph forms a common input quantity for the second convolutional layer. The output quantity 318 of the first operation 316 comprises, for example, an output of a ReLU activation of this second convolutional layer and the embeddings 338 of the nodes of the first graph.

The second operation 332 comprises a neural network, in one embodiment. This neural network comprises, for example, a first convolutional layer, which is connected to a second convolutional layer via a ReLU activation. In the example, the output of the ReLU activation together with the embeddings 340 of the nodes of the first graph forms a common input quantity for the second convolutional layer. The output quantity 334 of the second operation 332 comprises, for example, an output of a ReLU activation of this second convolutional layer and the embeddings 340 of the nodes of the first graph.

What is claimed is:

1. A method for determining a classification of an object, comprising the following steps:
acquiring sensor data using a radar sensor;
determining a radar spectrum which includes radar reflections as a function of the sensor data;
determining embeddings of sections from the radar spectrum which include at least one radar reflection, which are each assigned to a node of a first graph;
determining edges of the first graph as a function of pairwise distances between the embeddings which are assigned to the nodes of the first graph;
for each edge of the first graph, determining a feature for the edge of the first graph as a function of the embeddings of two nodes of the first graph which are connected to one another by the edge of the first graph;
for each node of the first graph, determining a feature for the node of the first graph as a function of the features for the edges of the first graph that connect the node of the first graph in the first graph to another node of the first graph;
providing characteristic quantities, including spatial coordinates or at least one measured property, for each radar reflection as a function of the sensor data;
for each radar reflection, determining an embedding which is assigned to a node of a second graph and which includes an embedding of the characteristic quantities and the characteristic quantities;
determining edges of the second graph as a function of pairwise distances between the embeddings which are assigned to the nodes of the second graph;
for each edge of the second graph, determining a feature for the edge of the second graph as a function of the embeddings of two nodes of the second graph which are connected to one another by the edge of the second graph;
for each node of the second graph, determining a feature for the node of the second graph as a function of the features for the edges of the second graph which connect the node of the second graph in the second graph to another node of the second graph; and
determining the classification of the object as a function of a quantity which includes a first part which is determined as a function of the features for the nodes of the first graph, and which includes a second part which is determined as a function of the features for the nodes of the second graph.

2. The method as recited in claim 1, wherein the embeddings of the sections from the radar spectrum include embedded features, the embedded features being extracted from spectral features from the sections using an encoder.

3. The method as recited in claim 1, characterized in that the first graph and/or the second graph is formed in a feature space extended by the features.

4. The method as recited in claim 1, wherein the quantity includes a third part: (i) which includes the embeddings of the nodes of the first graph, and/or (ii) which includes the embeddings of the nodes of the second graph.

5. The method as recited in claim 1, wherein: (i) the pairwise distance of embeddings which are each assigned to one of the nodes of the first graph is determined as a function of a difference between the embeddings, and/or (ii) the pairwise distance of embeddings which are each assigned to one of the nodes of the second graph is determined as a function of a difference between the embeddings.

6. The method as recited in claim 1, wherein, for each node of the first graph, the feature for the node of the first graph is determined as a function of a distance from the radar sensor and a Doppler velocity which is assigned to a radar reflection which includes the section of the radar spectrum assigned to the node of the first graph.

7. The method as recited in claim 1, wherein the first graph includes edges which each connect one of the nodes of the first graph to a specified number of its closest nodes in the first graph, or the first graph includes edges which each connect one of the nodes of the first graph to a specified number of its most distant nodes of the first graph, or the first graph includes edges which each connect one of the nodes of the first graph to a specified number of randomly selected other nodes of the first graph, or the first graph includes edges by which each node in the first graph is connected to every other node of the first graph by an edge.

8. The method as recited in claim 1, wherein the second graph includes edges which connect each of the nodes to a specified number of its closest nodes in the second graph, or the second graph includes edges which connect each of the nodes of the second graph to a specified number of its most distant nodes of the second graph, or the second graph includes edges which each connect one of the nodes of the second graph to a specified number of randomly selected other nodes of the second graph, or the second graph includes edges by which each node in the second graph is connected to every other node of the second graph by an edge.

9. A device for determining a classification of an object, the device comprising:
at least one memory, and at least one processor, the at least one processor being configured to execute machine-readable instructions, and the at least one memory is configured to store the instruction;
wherein the instructions, when executed by the at least one processor, causes the at least one processor to perform:
acquiring sensor data using a radar sensor,
determining a radar spectrum which includes radar reflections as a function of the sensor data,
determining embeddings of sections from the radar spectrum which include at least one radar reflection, which are each assigned to a node of a first graph,
determining edges of the first graph as a function of pairwise distances between the embeddings which are assigned to the nodes of the first graph,
for each edge of the first graph, determining a feature for the edge of the first graph as a function of the embeddings of two nodes of the first graph which are connected to one another by the edge of the first graph,
for each node of the first graph, determining a feature for the node of the first graph as a function of the features for the edges of the first graph that connect the node of the first graph in the first graph to another node of the first graph,
providing characteristic quantities, including spatial coordinates or at least one measured property, for each radar reflection as a function of the sensor data,
for each radar reflection, determining an embedding which is assigned to a node of a second graph and which includes an embedding of the characteristic quantities and the characteristic quantities,
determining edges of the second graph as a function of pairwise distances between the embeddings which are assigned to the nodes of the second graph,
for each edge of the second graph, determining a feature for the edge of the second graph as a function of the embeddings of two nodes of the second graph which are connected to one another by the edge of the second graph, for each node of the second graph, determining a feature for the node of the second graph as a function of the features for the edges of the second graph which connect the node of the second graph in the second graph to another node of the second graph, and determining the classification of the object as a function of a quantity which includes a first part which is determined as a function of the features for the nodes of the first graph, and which includes a second part which is determined as a function of the features for the nodes of the second graph.

10. The device as recited in claim 9, further comprising the radar sensor configured to acquire the sensor data.

11. A non-transitory machine-readable medium on which is stored a program including machine-readable instructions for determining a classification of an object, the instructions, when executed by a processor, causing the processor to perform the following steps:

acquiring sensor data using a radar sensor;

determining a radar spectrum which includes radar reflections as a function of the sensor data;

determining embeddings of sections from the radar spectrum which include at least one radar reflection, which are each assigned to a node of a first graph;

determining edges of the first graph as a function of pairwise distances between the embeddings which are assigned to the nodes of the first graph;

for each edge of the first graph, determining a feature for the edge of the first graph as a function of the embeddings of two nodes of the first graph which are connected to one another by the edge of the first graph;

for each node of the first graph, determining a feature for the node of the first graph as a function of the features for the edges of the first graph that connect the node of the first graph in the first graph to another node of the first graph;

providing characteristic quantities, including spatial coordinates or at least one measured property, for each radar reflection as a function of the sensor data;

for each radar reflection, determining an embedding which is assigned to a node of a second graph and which includes an embedding of the characteristic quantities and the characteristic quantities;

determining edges of the second graph as a function of pairwise distances between the embeddings which are assigned to the nodes of the second graph;

for each edge of the second graph, determining a feature for the edge of the second graph as a function of the embeddings of two nodes of the second graph which are connected to one another by the edge of the second graph;

for each node of the second graph, determining a feature for the node of the second graph as a function of the features for the edges of the second graph which connect the node of the second graph in the second graph to another node of the second graph; and determining the classification of the object as a function of a quantity which includes a first part which is determined as a function of the features for the nodes of the first graph, and which includes a second part which is determined as a function of the features for the nodes of the second graph.

* * * * *